(12) United States Patent
Abrahams et al.

(10) Patent No.: US 11,977,540 B2
(45) Date of Patent: May 7, 2024

(54) DATA VIRTUALIZATION IN NATURAL LANGUAGE

(71) Applicant: INTERNATIONAL BUSINESS MACHINES CORPORATION, Armonk, NY (US)

(72) Inventors: Faried Abrahams, Laytonsville, MD (US); Gandhi Sivakumar, Bentleigh (AU); Vinod A. Valecha, Pune (IN); Neal Fishman, Sparta, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 17/532,277

(22) Filed: Nov. 22, 2021

(65) Prior Publication Data
US 2023/0161761 A1   May 25, 2023

(51) Int. Cl.
G06F 16/242 (2019.01)
G06F 16/248 (2019.01)
G06F 40/20 (2020.01)

(52) U.S. Cl.
CPC ........ G06F 16/2425 (2019.01); G06F 16/248 (2019.01); G06F 40/20 (2020.01)

(58) Field of Classification Search
None
See application file for complete search history.

(56) References Cited

U.S. PATENT DOCUMENTS

| 6,182,029 | B1 | 1/2001 | Friedman |
| 6,901,409 | B2 | 5/2005 | Dessloch et al. |
| 7,792,817 | B2 | 9/2010 | Shan et al. |
| 9,224,103 | B1 | 12/2015 | Subramanya et al. |
| 9,471,283 | B2 | 10/2016 | Esfahany et al. |
| 10,521,464 | B2 | 12/2019 | Juneja et al. |
| 10,872,105 | B2 | 12/2020 | Taneja et al. |
| 2008/0249981 | A1 | 10/2008 | Norring et al. |
| 2011/0213765 | A1* | 9/2011 | Cui ........................ G06F 16/951 707/711 |
| 2017/0300563 | A1* | 10/2017 | Kao ........................ G06F 16/36 |
| 2018/0113867 | A1* | 4/2018 | Erpenbach .............. G06F 40/10 |

(Continued)

FOREIGN PATENT DOCUMENTS

WO   2020075062   4/2020

OTHER PUBLICATIONS

Meschkat, "Disambiguation of entity references using related entities", https://priorart.ip.com/IPCOM/000253439, IP.com PAD, Mar. 26, 2018, 7 pages.

(Continued)

Primary Examiner — Dawaune A Conyers

(74) Attorney, Agent, or Firm — Gavin Giraud; Andrew D. Wright; Calderon Safran & Cole, P.C

(57) ABSTRACT

A method includes: creating, by a computing device, a virtual consolidation layer; replicating, by the computing device, snippets that are results of a query; copying, by the computing device, the replicated snippets to the virtual consolidation layer; performing, by the computing device and by a machine learning model, matching of particular ones of the snippets in the virtual consolidation layer; and producing, by the computing device, a search result comprising the matched snippets.

20 Claims, 8 Drawing Sheets

(56) References Cited

U.S. PATENT DOCUMENTS

| | | | | |
|---|---|---|---|---|
| 2019/0362021 A1* | 11/2019 | Balduino | ............... | G06Q 30/01 |
| 2020/0320370 A1* | 10/2020 | Khatri | .................... | G06N 3/044 |
| 2021/0056164 A1 | 2/2021 | Mustafi | | |
| 2021/0397670 A1* | 12/2021 | Cohen | ................. | G06F 3/04817 |
| 2023/0169201 A1* | 6/2023 | Yeo | ....................... | H04L 9/0894 |
| | | | | 713/165 |

OTHER PUBLICATIONS

Mell et al., "The NIST Definition of Cloud Computing", NIST, Special Publication 800-145, Sep. 2011, 7 pages.

\* cited by examiner

DATA VIRTUALIZATION IN NATURAL LANGUAGE

BACKGROUND

Aspects of the present invention relate generally to computer searches and, more particularly, to virtualizing data in natural language searches.

Data virtualization is an approach to data management that allows an application to retrieve and manipulate data without requiring technical details about the data, such as how it is formatted at source, or where it is physically located. Data virtualization can provide a single customer view (or single view of any other entity) of the overall data. Two techniques exist for data virtualization, consolidation and federation. Consolidation is a technique where there are plural data tables in a backend. Consolidation creates a sub-set of data from the data tables and brings that sub-set of the data to a single point. Federation does not bring the sub-set of the data to a single point but, instead, creates pointers to the data. To use the data, federation pulls-up an identification of each pointer to find the data.

In a natural language world, when a user reads through a document, references to different sections are provided and the user is able to understand the context associated with those references. Examples of such references are: "as stated earlier"; "as shown in the figure above"; and "referring to sections 2 and 3". Different references to the content are created in case of natural language writing and reading.

SUMMARY

In a first aspect of the invention, there is a computer-implemented method including: creating, by a computing device, a virtual consolidation layer; replicating, by the computing device, snippets that are results of a query; copying, by the computing device, the replicated snippets to the virtual consolidation layer; performing, by the computing device and by a machine learning model, matching of particular ones of the snippets in the virtual consolidation layer; and producing, by the computing device, a search result comprising the matched snippets.

In another aspect of the invention, there is a computer-implemented method including: creating, by a computing device, a virtual federation layer; storing, by the computing device and in the virtual federation layer, pointers to snippets that are results of a query; performing, by the computing device and by a machine learning model, matching of particular ones of the snippets pointed to in the virtual federation layer; and producing, by the computing device, a search result comprising the matched snippets.

In another aspect of the invention, there is a computer program product including one or more computer readable storage media having program instructions collectively stored on the one or more computer readable storage media. The program instructions are executable to: create a virtual consolidation layer; replicate snippets that are the result of a query; copy the replicated snippets to the virtual consolidation layer; perform, by a machine learning model, matching of particular ones of the snippets in the virtual consolidation layer; and produce a search result comprising the matched snippets.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
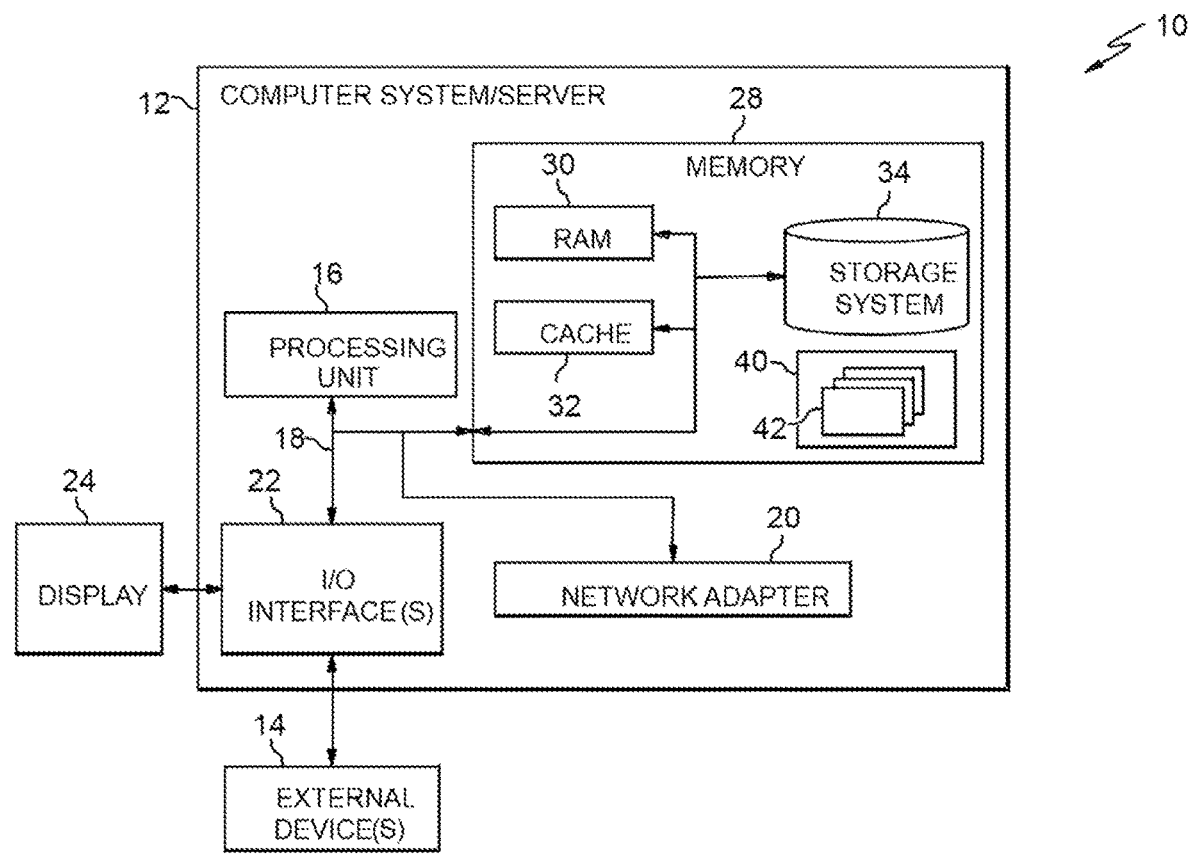
FIG. 1 depicts a cloud computing node according to an embodiment of the present invention.

Aspects of the present invention relate generally to computer searches and, more particularly, to virtualizing data in natural language searches. According to aspects of the invention, a search query is performed. In embodiments, a virtual consolidation layer is created to store intermediate search results that are then matched using machine learning. In this manner, implementations of the invention produce more comprehensive search results that include data that conventional computer searches would not include.

Embodiments, of the invention provide methods and systems to create a virtual layer of a referred element. Methods in accordance with embodiments of the invention link referred content in natural language processing and bring the corpus elements to the virtual layer where it is ready for consumption by machine learning models. In common name (CN) consolidation patterns, embodiments create an ephemeral (temporary) consolidation layer by replicating an unstructured information management architecture (UIMA) classified corpus of snippets that are similar. A natural language query passes through the normal matching procedures and then switches to the ephemeral layer for snippets classified as similar. Embodiments then perform a next level of matching for similarity.

Embodiments of the invention provide improved computer searching methods and systems to address the technical problems of missing important data and/or producing an undesirably large number search results. Implementations of the invention provide new functionality enabling the efficient production of relevant search results by creating and using a virtual consolidation layer to store intermediate search results on which matching is performed.

It should be understood that, to the extent implementations of the invention collect, store, or employ personal information provided by, or obtained from, individuals such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
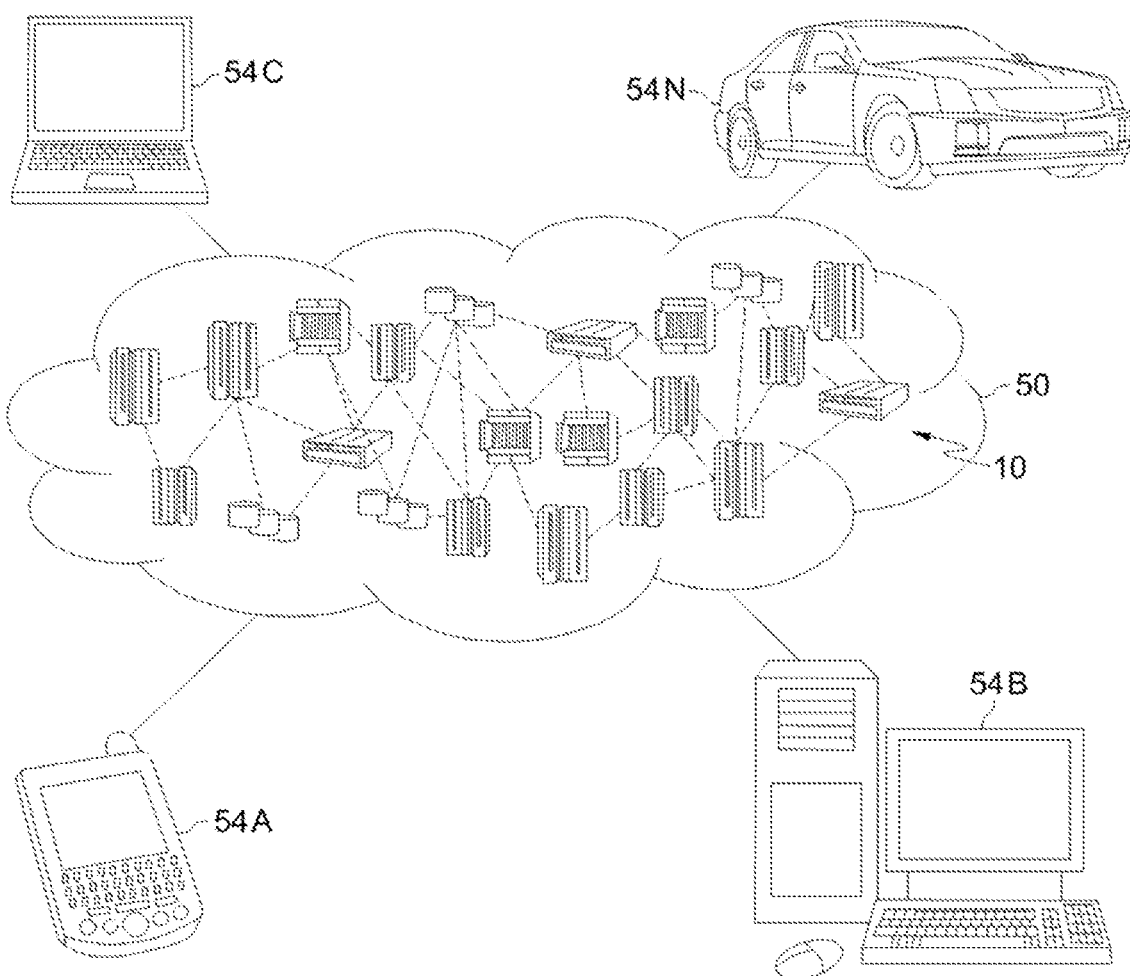
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
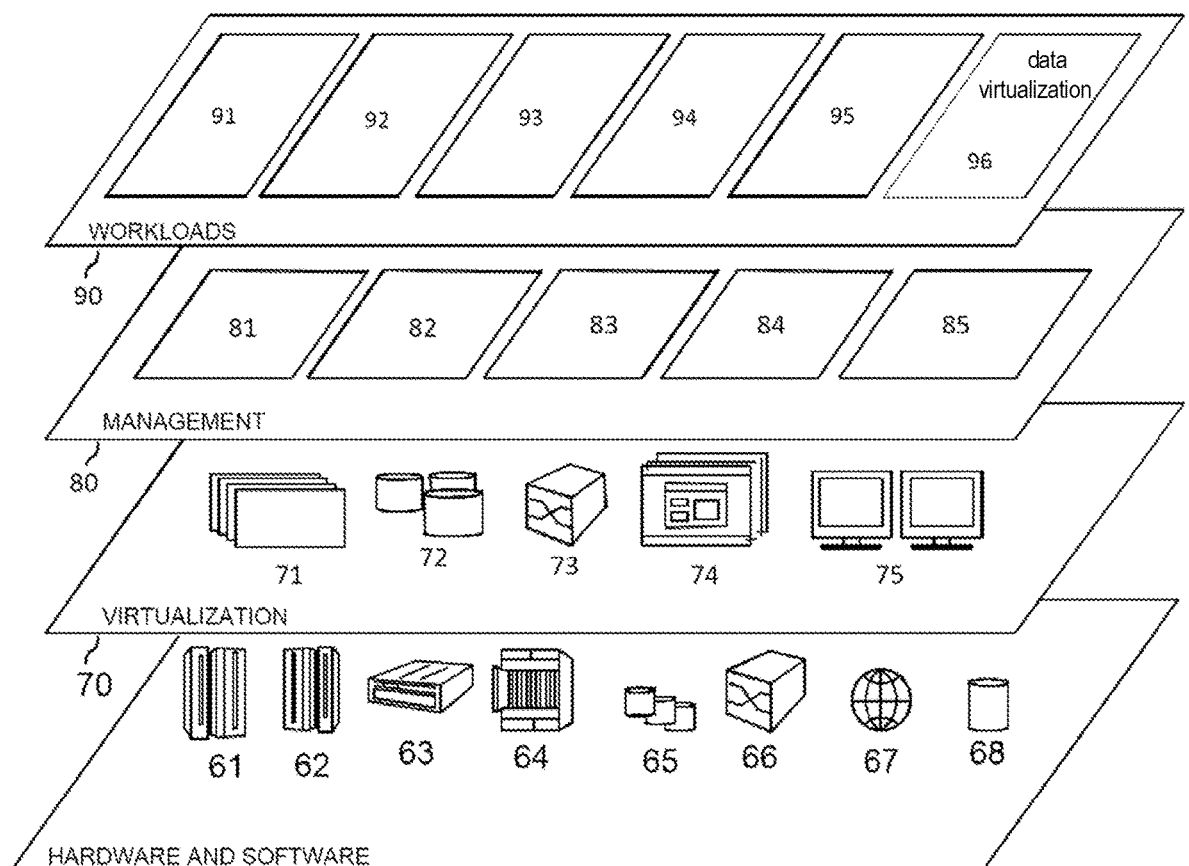
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and data virtualization 96.

Implementations of the invention may include a computer system/server 12 of FIG. 1 in which one or more of the program modules 42 are configured to perform (or cause the computer system/server 12 to perform) one of more functions of the data virtualization 96 of FIG. 3. For example, the one or more of the program modules 42 may be configured to: create a virtual consolidation layer; replicate snippets that are the result of a query; copy the replicated snippets to the virtual consolidation layer; perform, by a machine learning model, matching of particular ones of the snippets in the virtual consolidation layer; and produce a search result comprising the matched snippets.

Different references to any particular content are created in natural language writing and reading such that different words can be used to reference the same content. There is gap in machine learning models such that they are not able to link this type of content and bring it to a virtual layer of a process where it would be ready for consumption. While regular expression rules-based mechanisms are used for aggregation, there are no algorithms that understand that this content is related to other content. As a result, these regular expression-based mechanisms do not build virtual layers on top of which machine learning models for matching could run.

Embodiments of the invention create a virtual layer to hold the results (snippets) of preliminary searches such as, for example, those using unstructured information management architecture (UIMA). Each snippet is a search result in a set of search results. In embodiments, the creation of the virtual layer is through consolidation of natural language snippets which are intra and/or inter documents. A natural language snippet is a snippet that is in natural language. In embodiments, the creation of the virtual layer is through federation of natural language snippets which are intra and/or inter documents. In embodiments, when a user searches for content that is related to a particular subject, the results of the search (often a large amount of data) are brought to the virtual layer so that the results are extensive. In embodiments, correlation of all the data that results from the search happens in the virtual layer.

Embodiments provide methods and systems that create a virtual layer of the search results (referred content). Embodiments link the referred content in natural language processing and bring the corpus elements to the virtual layer where it is ready for consumption by machine learning models.

Figure 4:
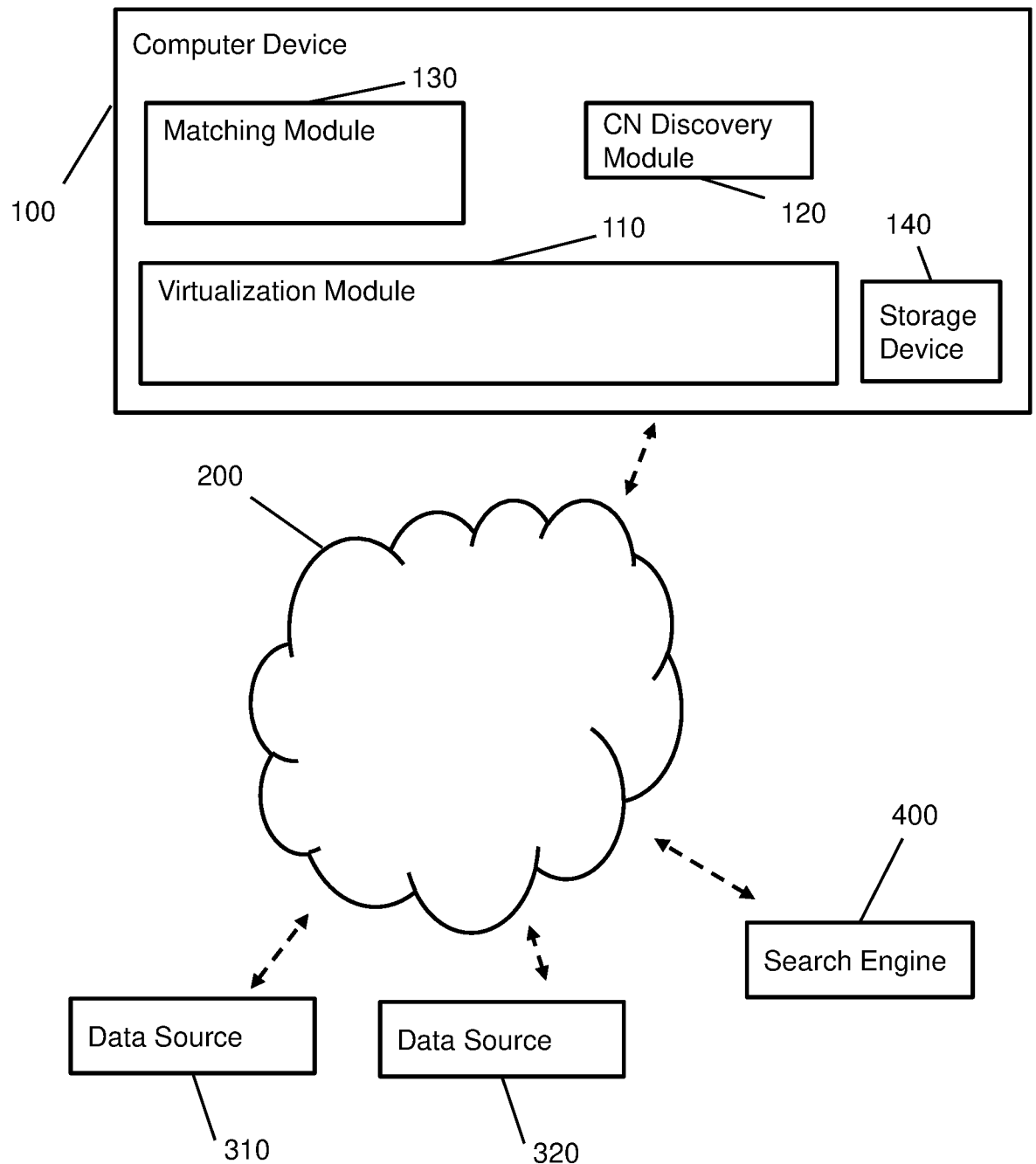
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In embodiments, computer device 100 comprises: a virtualization module 110 comprising, for example, one or more of program modules 42 in FIG. 1; a common name (CN) discovery module 120 comprising, for example, one or more of program modules 42 in FIG. 1; a matching module 130 comprising, for example one or more of program modules 42 in FIG. 1; and a storage device 140 such as, for example, storage system 34 in FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, virtualization module 110 shown in FIG. 4 is configured to perform various functions described below, including creating a virtualization layer. In embodiments, CN discovery engine 120 performs searches, as described in more detail below. FIG. 4 shows two data sources 310, 320 that are accessed by CN discovery module 120 to produce search results that virtualization module 110 uses to create the virtualization layer. While two data sources 310, 320 are shown in FIG. 4, in embodiments, more or fewer data sources are accessed and searched during a search. In embodiments, data sources 310, 320 are sources of data such as, for example, databases and/or websites. In embodiments, the virtualization layer is stored in storage device 140. In embodiments, matching module 130 is configured to perform matching of some of the search results based on, for example, machine learning models to produce, as a final search result, further refined search results. In embodiments, some or all of the search functions described as being performed by CH discovery module 120 are performed by an external search engine 400, shown in FIG. 4.

Figure 5:
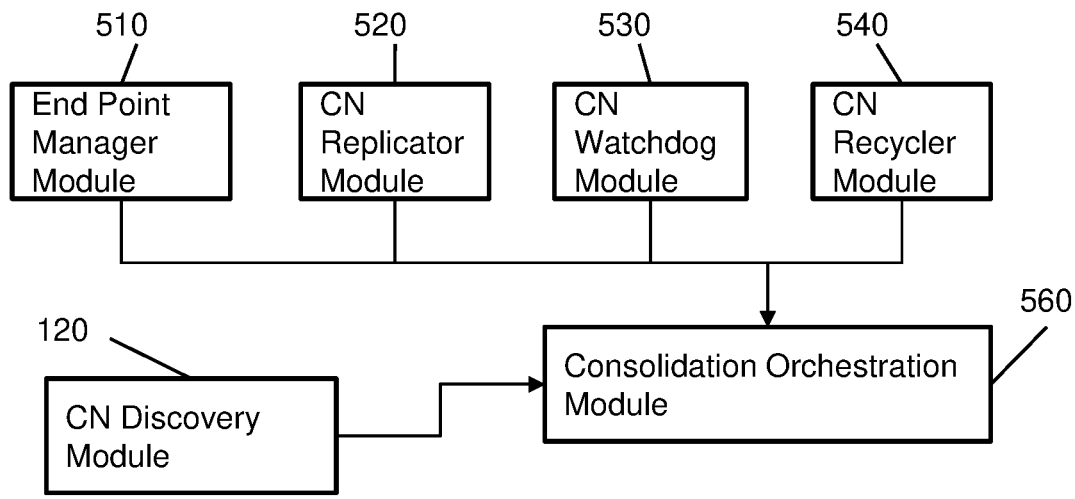
FIG. 5 shows a block diagram of an exemplary environment in accordance with aspects of the invention.

FIG. 5 shows an example of common name (CN) consolidation in accordance with embodiments of the invention. In an exemplary CN consolidation pattern, virtualization module 110 creates a temporary consolidation layer (virtual consolidation layer) by replicating UIMA classified snippets into a corpus of snippets which are identified by CN discovery module 120 as being similar. In embodiments, a consolidation layer is a layer of processing where consolidated intermediate results are stored. In embodiments, this is performed by running a query (for example, a natural language query using natural language processing) and copying the results to the consolidation layer if a similar classification is identified. In embodiments, the query uses analytics based on UIMA. Matching module 130 then performs a next level of matching within the consolidation layer. FIG. 5 shows an end point manager module 510 which, in embodiments, manages an end point of the corpus of snippets to the consolidation layer. FIG. 5 shows a CN replicator module 520 which, in embodiments, creates a replica of the corpus of snippets in the consolidation layer. FIG. 5 shows a CN watchdog module 530 which, in embodiments, monitors changes to the corpus of snippets. FIG. 5 shows a CN recycler module 540 which, in embodiments, recycles and realigns (refreshes) the corpus of snippets. For example, in embodiments, CN recycler module 540 refreshes the corpus of snippets by updating the search results (adding and/or subtracting snippets) and/or updating the content of one or more snippets as a result of information changes at the source of the one or more snippets. FIG. 5 shows a consolidation orchestration module 560 which, in embodiments, orchestrates the operations and interactions of CN discovery module 120, end point manager module 510, CN replicator module 520, CN watchdog module 530, and CN recycler module 540. When CN watchdog module 530 senses corpus additions/changes that are, for example, triggered through a change in query results, it refreshes the consolidation layer.

Figure 6:
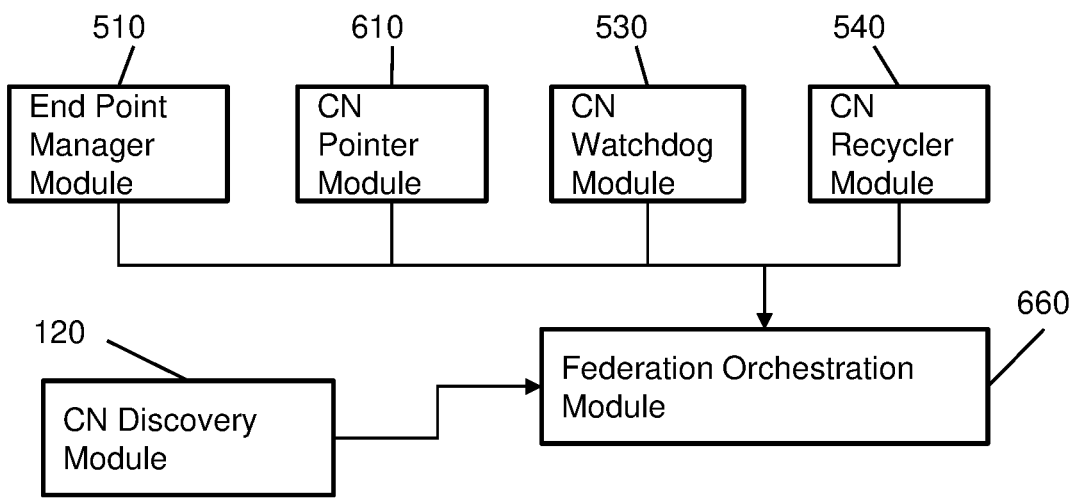
FIG. 6 shows a block diagram of an exemplary environment in accordance with aspects of the invention.

FIG. 6 shows an example of CN federation in accordance with embodiments of the invention. In an exemplary CN federation pattern, virtualization module 110 creates a temporary federation layer (virtual federation layer) that includes pointers to UIMA classified snippets into a corpus of snippets which are identified by CN discovery module 120 as being similar. FIG. 6 shows a CN pointer module 610 which, in embodiments, points to the various snippets in the corpus of snippets identified by CN discovery module 120. In FIG. 6, in embodiments, end point manager module 510 manages an end point of the corpus of snippets which is used by CN pointer module 610 to find the snippets. FIG. 6 shows a federation orchestration module 660 which, in embodiments, orchestrates the operations and interactions of CN discovery module 120, end point manager module 510, CN pointer module 610, CN watchdog module 530, and CN recycler module 540. The reminder of the elements shown in FIG. 6 operated as described above with reference to FIG. 5.

Figure 7:
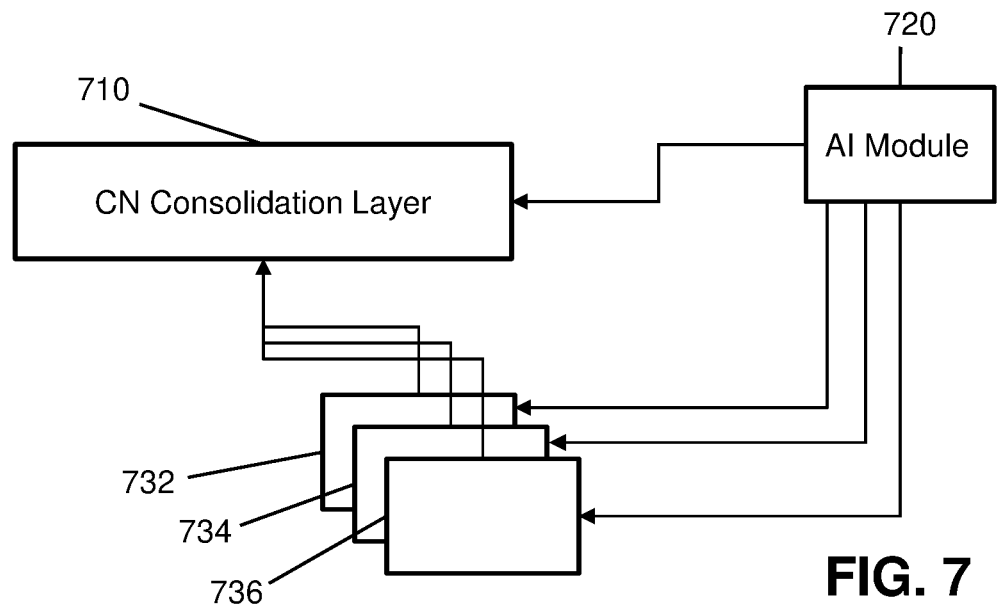
FIG. 7 shows an example of consolidation in accordance with aspects of the invention.

FIG. 7 shows an example of consolidation by an embodiment of the invention where an artificial intelligence (AI) module 720 performs the functions of CN discovery module 120 in FIG. 5 and runs a query that results in snippets 732, 734, 736 being copied to a CN consolidation layer 710. In embodiments, AI module 720 performs the function of matching module 130 and uses matching parameters to create probabilistic scores for each snippet to represent the probability of the particular snippet being correctly associated with the target of the search query.

Figure 8:
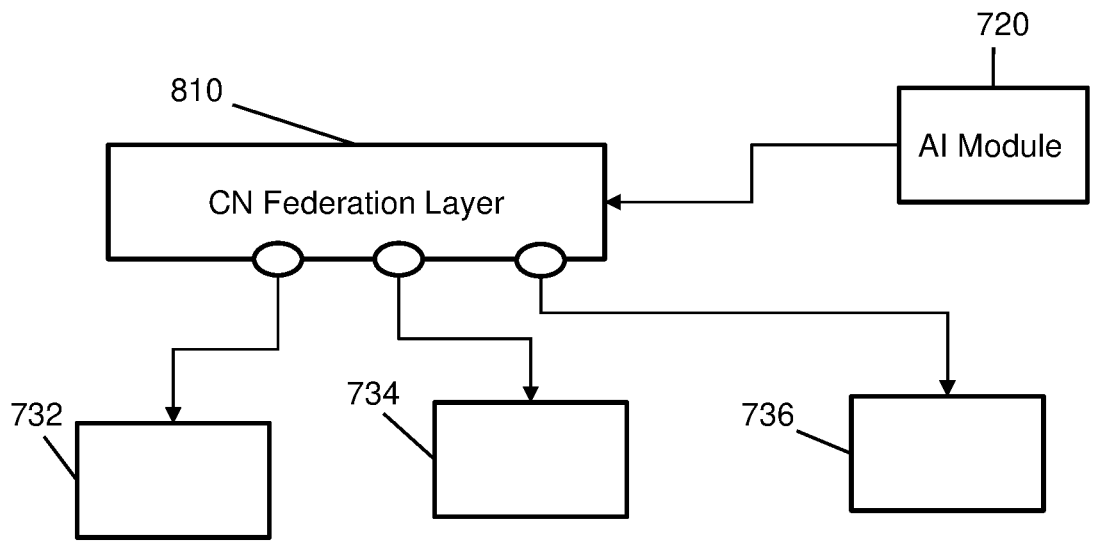
FIG. 8 shows an example of federation in accordance with aspects of the invention.

FIG. 8 shows an example of federation by an embodiment of the invention where AI module 720 uses artificial intelligence to perform the functions of CN discovery module 120 in FIG. 6 and runs a query that results in the creation of pointers to snippets 732, 734, 736 being copied to a CN federation layer 810. In embodiments, AI module 720 uses artificial intelligence to perform the functions of matching module 130 and uses matching parameters to create probabilistic scores for each snippet to represent the probability of the particular snippet being correctly associated with the target of the search query.

Figure 9:
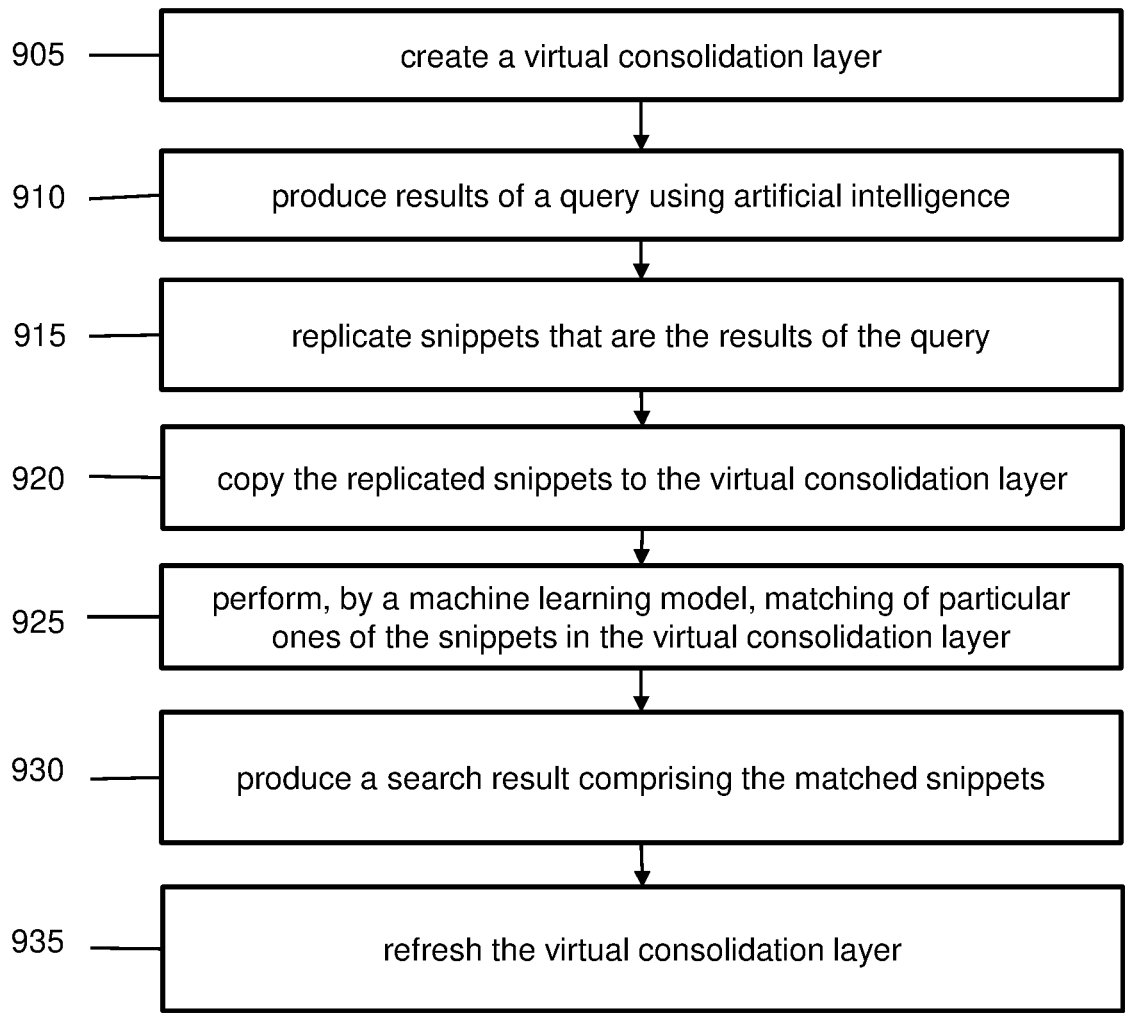
FIG. 9 shows a flowchart of an exemplary method in accordance with aspects of the invention.

FIG. 9 shows a flowchart of an exemplary method in accordance with aspects of the present invention. Steps of the method may be carried out in the environment of FIGS. 4-8 and are described with reference to elements depicted in FIGS. 4-8.

At step 905, the system creates a virtual consolidation layer. In embodiments, and as described with respect to FIGS. 4-8, virtualization module 110 creates CN consolidation layer 710.

At step 910, the system produces results of a query using artificial intelligence. In embodiments, and as described with respect to FIGS. 4-8, CN discovery module 120 produces results of a query using artificial intelligence.

At step 915, the system replicates snippets that are the results of the query. In embodiments, and as described with respect to FIGS. 4-8, CN replicator module 520 replicates snippets that are the results of the query.

At step 920, the system copies the replicated snippets to the virtual consolidation layer. In embodiments, and as described with respect to FIGS. 4-8, virtualization module 110 copies the replicated snippets to CN consolidation layer 710.

At step 925, the system performs, by a machine learning model, matching of particular ones of the snippets in the virtual consolidation layer. In embodiments, and as described with respect to FIGS. 4-8, matching module 130 performs, by a machine learning model, matching of particular ones of the snippets to others of the snippets in CN consolidation layer 710.

At step 930, the system produces a search result comprising the matched snippets. In embodiments, and as described with respect to FIGS. 4-8, virtualization module 110 produces a search result comprising the matched snippets. In embodiments, the produced results are delivered to a computer device (for example a smartphone, computer, computer terminal, or other electronic device) from which the query was received.

At step 935, the system refreshes the virtual consolidation layer. In embodiments, and as described with respect to FIGS. 4-8, CN recycler module 540 refreshes the CN consolidation layer 710.

Figure 10:
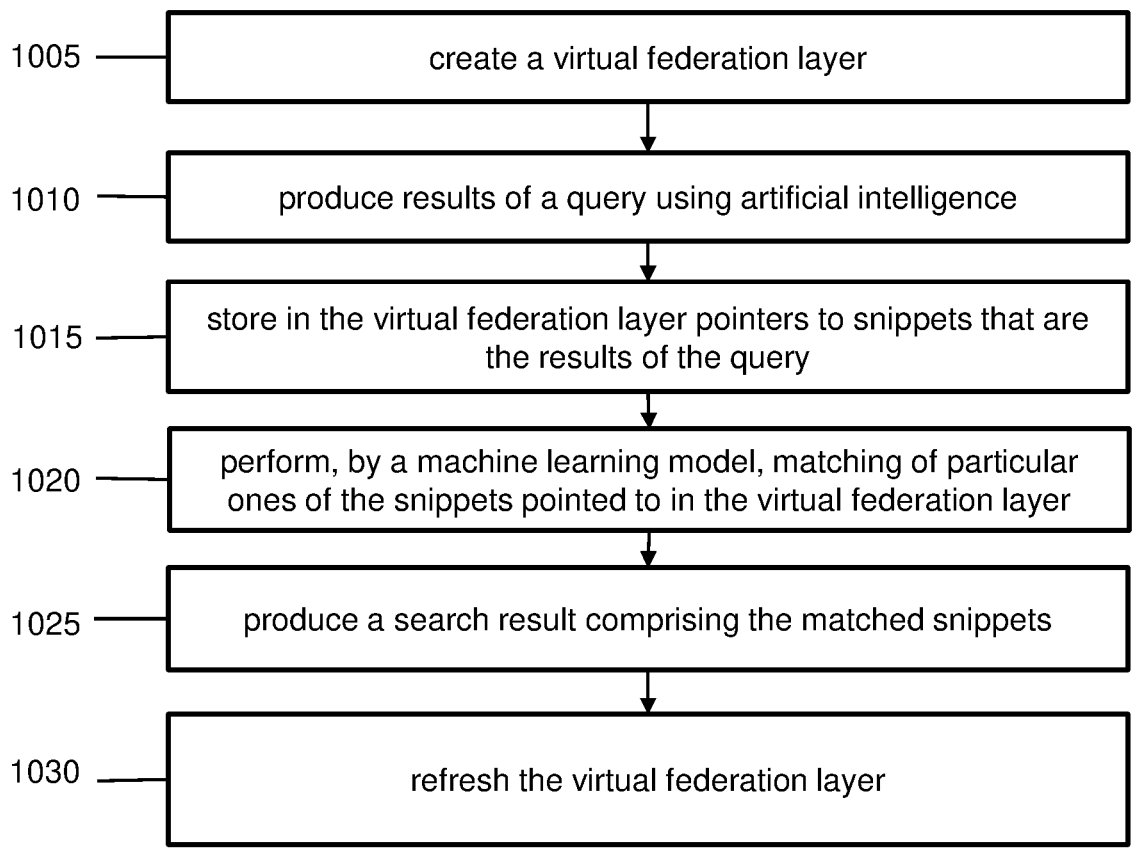
FIG. 10 shows a flowchart of an exemplary method in accordance with aspects of the invention.

FIG. 10 shows a flowchart of an exemplary method in accordance with aspects of the present invention. Steps of the method may be carried out in the environment of FIGS. 4-8 and are described with reference to elements depicted in FIGS. 4-8.

At step 1005, the system creates a virtual federation layer. In embodiments, and as described with respect to FIGS. 4-8, virtualization module 110 creates CN federation layer 810.

At step 1010, the system produces results of a query using artificial intelligence. In embodiments, and as described with respect to FIGS. 4-8, CN discovery module 120 produces results of a query using artificial intelligence.

At step 1015, the system stores in the virtual federation layer pointers to snippets that are the results of the query. In embodiments, and as described with respect to FIGS. 4-8, virtualization module 110 stores in CN federation layer 810 pointers to snippets that are the results of the query.

At step 1020, the system performs, by a machine learning model, matching of particular ones of the snippets pointed to in the virtual federation layer. In embodiments, and as described with respect to FIGS. 4-8, matching module 130 performs, by a machine learning model, matching of particular ones of the snippets pointed to in CN federation layer 810.

At step 1025, the system produces a search result comprising the matched snippets. In embodiments, and as described with respect to FIGS. 4-8, virtualization module 110 produces a search result comprising the matched snippets.

At step 1030, the system refreshes the virtual federation layer. In embodiments, and as described with respect to FIGS. 4-8, CN recycler module 540 refreshes CN federation layer 810.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    creating, by a computing device, a virtual consolidation layer;
    running, by the computing device, a query to determine results including a corpus of snippets using a common name (CN) discovery engine;
    replicating, by the computing device, unstructured information management architecture (UIMA) classified snippets into the corpus of snippets that are the results of running the query for similarity between the UIMA classified snippets and the corpus of snippets;
    copying, by the computing device, the replicated corpus of snippets to the virtual consolidation layer as a result of similarity between the replicated corpus of snippets and the UIMA classified snippets;
    performing, by the computing device and using a machine learning model, matching of particular ones of the replicated corpus of snippets in the virtual consolidation layer by using matching parameters to create probabilistic scores for each of the replicated corpus of snippets to represent the probability of the particular ones of the replicated corpus of snippets being correctly associated with a target of the query; and
    producing, by the computing device, a search result comprising the matched snippets.

2. The method of claim 1, wherein the virtual consolidation layer is a temporary virtual consolidation layer.

3. The method of claim 1, wherein the query uses analytics based on the unstructured information management architecture (UIMA).

4. The method of claim 1, wherein the query uses natural language processing.

5. The method of claim 1, further comprising refreshing, by the computing device, the virtual consolidation layer.

6. The method of claim 5, wherein the refreshing includes a change in the corpus of snippets.

7. The method of claim 1, further comprising producing, by the computing device, the results of the query using artificial intelligence.

8. The method of claim 1, further comprising monitoring, by the computing device, the corpus of snippets for an information change at a source of at least one snippet of the corpus of snippets.

9. The method of claim 8, further comprising refreshing, by the computing device, the corpus of snippets by updating the search result and updating content of the at least one snippet of the corpus of snippets in response to the information change at the source of the at least one snippet.

10. A method, comprising:
    creating, by a computing device, a virtual federation layer;
    running, by the computing device, a query to determine results including a corpus of snippets using a common name (CN) discovery engine;
    storing, by the computing device and in the virtual federation layer, pointers to unstructured information management architecture (UIMA) classified snippets into the corpus of snippets that are the results of running qathe query for similarity between the UIMA classified snippets and the corpus of snippets;
    performing, by the computing device and by a machine learning model, matching of particular ones of the replicated corpus of snippets pointed to in the virtual federation layer by using matching parameters to create probabilistic scores for each of the replicated corpus of snippets to represent the probability of the particular ones of the replicated corpus of snippets being correctly associated with a target of the query; and
    producing, by the computing device, a search result comprising the matched snippets.

11. The method of claim 10, wherein the virtual federation layer is a temporary virtual federation layer.

12. The method of claim 10, wherein the query uses analytics based on unstructured information management architecture (UIMA).

13. The method of claim 10, wherein the query uses natural language processing.

14. The method of claim 10, further comprising refreshing, by the computing device, the virtual federation layer.

15. The method of claim 14, wherein the refreshing includes a change in the corpus of snippets.

16. The method of claim 10, further comprising producing, by the computing device, the results of the query using artificial intelligence.

17. A computer program product comprising one or more computer readable storage media having program instructions collectively stored on the one or more computer readable storage media, the program instructions executable to:
    create a virtual consolidation layer;
    run a query to determine a result including a corpus of snippets using a common name (CN) discovery engine;
    replicate unstructured information management architecture (UIMA) classified snippets into the corpus of snippets that are the result of running the query for similarity between the UIMA classified snippets and the corpus of snippets;
    copy the replicated corpus of snippets to the virtual consolidation layer as a result of similarity between the replicated corpus of snippets and the UIMA classified snippets;
    perform, by a machine learning model, matching of particular ones of the replicated corpus of snippets in the virtual consolidation layer by using matching parameters to create probabilistic scores for each of the replicated corpus of snippets to represent the probability of the particular ones of the replicated corpus of snippets being correctly associated with a target of the query; and
    produce a search result comprising the matched snippets.

18. The computer program product of claim 17, wherein the virtual consolidation layer is a temporary virtual consolidation layer.

19. The computer program product of claim 17, wherein the query uses natural language processing.

20. The computer program product of claim 17, wherein the program instructions are further executable to produce the results of the query using artificial intelligence.

* * * * *